United States Patent [19]

Forget

[11] Patent Number: 5,265,934
[45] Date of Patent: Nov. 30, 1993

[54] LIFTING DEVICE FOR THE CUSHION OF A VEHICLE SEAT

[75] Inventor: Dominique Forget, Orne, France

[73] Assignee: Bertrand Faure Automobile "BFA", Essonne, France

[21] Appl. No.: 897,467

[22] Filed: Jun. 11, 1992

[30] Foreign Application Priority Data

Jun. 11, 1991 [FR] France ................... 91 07060

[51] Int. Cl.$^5$ .............................................. A47C 15/00
[52] U.S. Cl. .............................. 297/237; 297/344.14
[58] Field of Search ............... 297/236, 237, 115, 346; 248/394

[56] References Cited

U.S. PATENT DOCUMENTS

| | | | |
|---|---|---|---|
| 1,427,280 | 8/1922 | Gahm | 297/346 X |
| 3,150,898 | 9/1964 | Knudson | 297/346 X |
| 3,319,921 | 5/1967 | Nichols | 297/346 X |
| 4,000,586 | 1/1977 | Vance et al. | 297/236 X |
| 4,768,827 | 9/1988 | Musgrove | 297/237 X |
| 5,121,964 | 6/1992 | Fourrey et al. | 297/237 |

FOREIGN PATENT DOCUMENTS 802184  6/1936  France ................... 297/346

Primary Examiner—Peter M. Cuomo
Assistant Examiner—Jerry Redman
Attorney, Agent, or Firm—Robert W. Becker & Associates

[57] ABSTRACT

The lifting device for a vertically adjustable front cushion of a vehicle seat comprises a support structure with first and second vertically extending flanges on either side. The first flanges have a fixedly connected first pin and the second flanges have a fixedly connected bearing with a rotatable second pin. The support armature of the front cushion has on either side a third and a fourth pin. First connecting rods are pivotably connected with the first and third pins. Each first connecting rod has a fifth pin between the first and third pin. Second connecting rods are pivotably connected with the second and fourth pins. Curved plates with a cutout are pivotably connected to the fifth pins. A horizontal S-shaped lever is pivotably connected with its center to the support structure. A fork is connected with a lug to the rear end of the S-shaped lever. A stud is connected to the support structure. Arms are fixed to the second pins, and a transverse stay connects their free ends. A control handle is connected to one of the second pins. When the front cushion is lifted, the cutouts engage the second pins and one rear end of the curved plates pivots the lever and displaces the fork into locking engagement with the stud for latching the front cushion in the upper position. For releasing the front cushion, by turning the control handle the transverse stay is rotated upwardly to disengage the cutouts and release the fork.

3 Claims, 3 Drawing Sheets

LIFTING DEVICE FOR THE CUSHION OF A VEHICLE SEAT

FIELD OF THE INVENTION

The invention relates to a lifting device for the cushion of a vehicle seat.

BACKGROUND OF THE INVENTION

The rear seats or full-length backseats of a vehicle are already known to be provided with sitting elements each comprising two cushions, i.e. a front cushion which is adjustable in height and a rear cushion which is fixed and bears against the lower portion of the seat back.

The forward adjustable cushion, which is adapted for forming a seat for a child when in its high position placed against a median surface of the seat back will hold the child with the assistance of a safety belt provided at this seat or this portion of the backseat.

Such seats with two cushions, one being fixed and the other adjustable, are adapted for transportation of a child between 3 and 10 years without having to attach, to the seat or the full-length backseat, a special heavy, bulky, and costly seat shell.

These conventional, vertically adjustable sitting elements have the disadvantage that the handling and lowering mechanism requires difficult manipulations and the use of two latching members whose operation is carried out separately; hence an important device results which does not ensure a perfect safety and which is also costly.

It is therefore an object of the present invention to remedy these disadvantages by providing a lifting device for the adjustable cushion of an automobile seat whose latching mechanism is operated automatically without particular manipulations, in which it suffices to lift the front cushion from the sitting element until this cushion, via its rear portion, will come into abutment at the median zone of the seat back.

The return of the front cushion to its normal position is achieved by operating a handle for instantaneously unlatching the mechanism, thus providing, under action of resilient elements a return of the adjustable front cushion to the normal position and reastablishing the sitting portion of the seat.

SUMMARY OF THE INVENTION

The lifting device for a vertically adjustable front cushion of a vehicle seat, the vehicle seat having a seat portion comprised of the vertically adjustable front cushion and a fixed rear cushion, according to the present invention is primarily characterized by:

the vehicle seat comprising a support structure with two side portions, each side portion having a first and a second vertically extending flange, each first flange having a fixedly connected first pin and each second flange having a fixedly connected bearing with a second pin rotatably supported in the bearing;

the vertically adjustable front cushion having a cushion support armature with a forward and a rearward portion, the forward portion having on either side a third pin and the rearward portion on either side a fourth pin;

first connecting rods pivotably connected with the first pins of the first flanges and with the third pins of the forward portion of the support armature, each connecting rod having a fifth pin arranged between the first and the third pin;

second connecting rods pivotably connected with the second pins of the second flanges and with the fourth pins of the rearward portion of the support armature;

curved plates each having a front end and a rear end, the front end pivotably connected to the fifth pin and the rear end having a cutout;

an essentially horizontally extending S-shaped lever with a rear end, a center portion, and a vertically extending front end, the S-shaped lever pivotably connected with its center portion to the support structure;

a fork having a recessed central portion and a lug opposite the recessed central portion, the rear end of the S-shaped lever being connected to the lug;

a stud connected to the support structure;

arms fixedly connected with a first end to the second pins;

a transverse stay connecting free ends of the arms;

a control handle connected to one of the second pins;

wherein, when the front cushion is lifted into an upper position, the cutouts engage the second pins and one of the rear ends of the curved plates engages the vertically extending front end of the S-shaped lever and pivots the S-shaped lever, thereby displacing the fork with the recessed central portion into locking engagement with the stud for latching the front cushion in the upper position; and wherein, for releasing the front cushion from the upper position, the control handle is turned such that the transverse stay is upwardly rotated to disengage the cutouts from the pins and release the recessed central portion from its locking engagement with the stud.

Preferably, the lifting device further comprises springs connected to the first flanges and curved plates for returning the curved plates into their rest position.

Advantageously, the lifting device also comprises a return spring connected to the S-shaped lever and the support structure for returning the S-shaped lever into its resting position in which the fork is released from the stud.

BRIEF DESCRIPTION OF THE DRAWINGS

An embodiment of the invention is shown by way of a non-limiting example in the accompanying drawings, in which.

DESCRIPTION OF PREFERRED EMBODIMENTS

Figure 1:
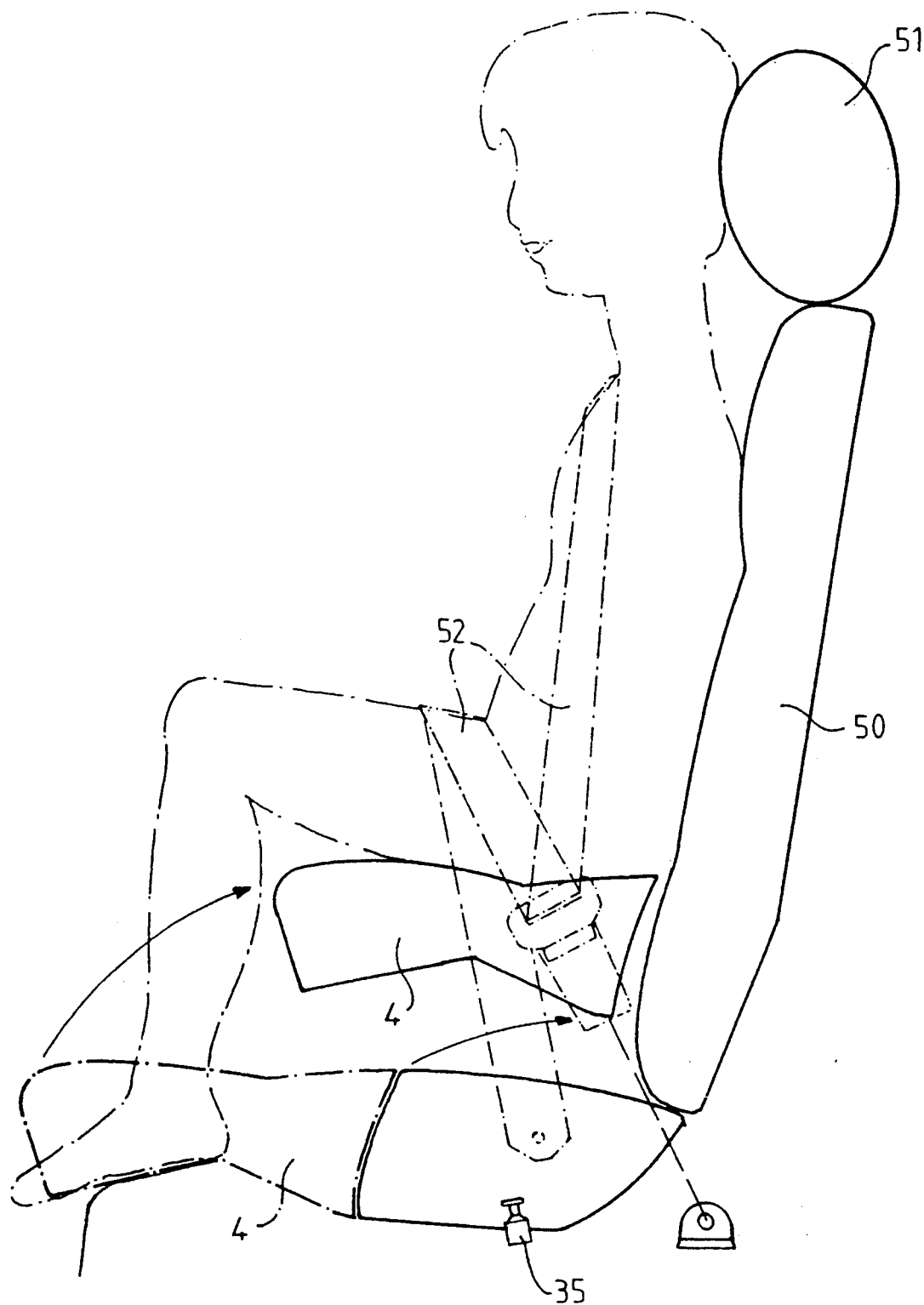
FIG. 1 is a schematic view showing the front cushion in the high position of use, with a child sitting thereon.
Figure 2:
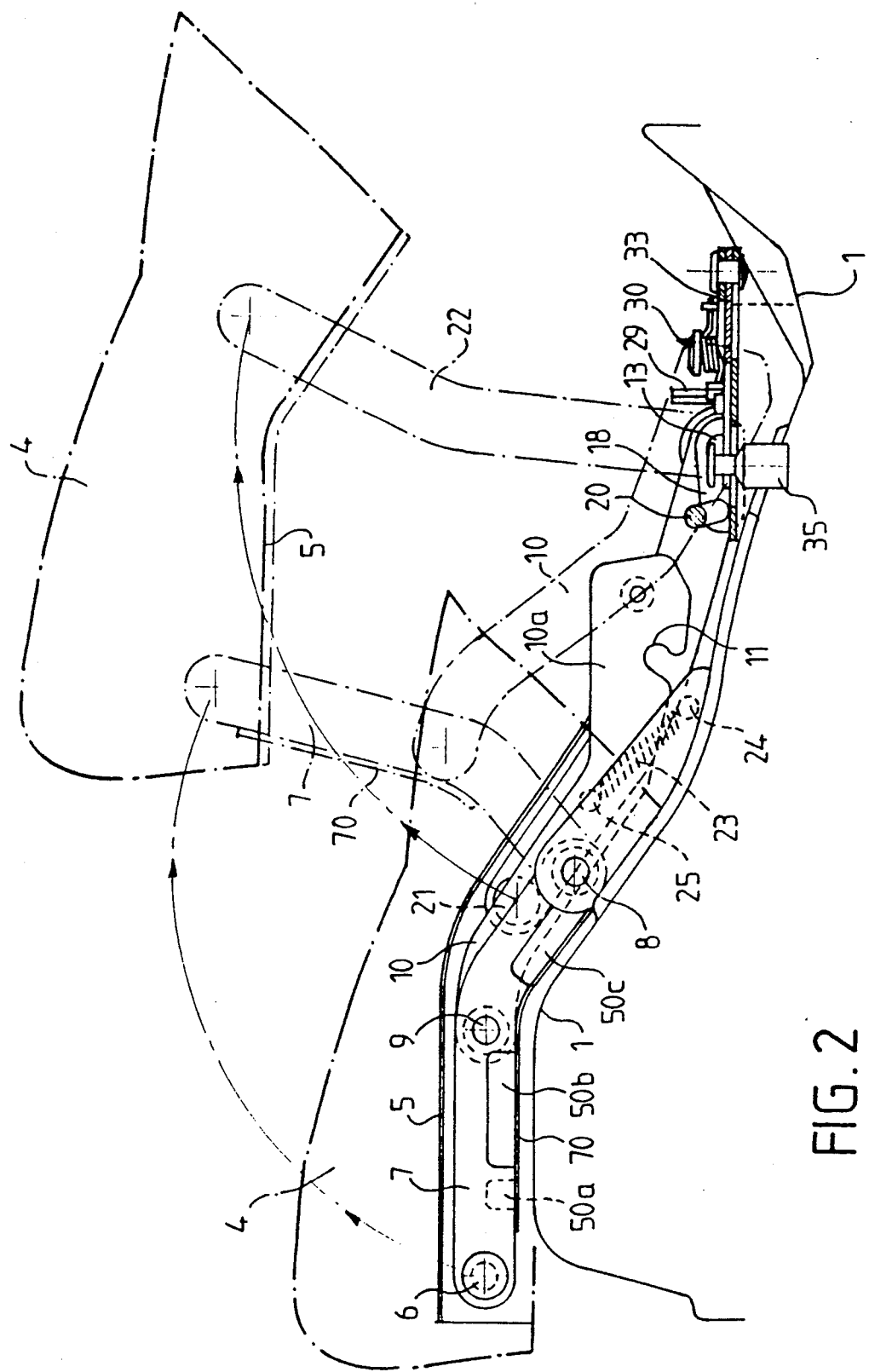
FIG. 2 is a side elevation view of the seat front cushion lifting device with its latching system.

Referring now to the drawings, FIGS. 1 and 2 show a support structure 1 of the seat that can be one half of the backseat of a vehicle.

The support structure 1 comprises, on both sides, flanges 2 and 2a extending vertically and fixed to an armature 17 of the support structure 1. Pivoting pins 8 and 13 are connected to the flanges 2, 2a and connecting rods 7 and 22 are pivotably connected to the pivot pins 8, 13.

A metal plate 70, provided for protecting the legs of the child when the seat is in the high position and for maintaining the lateral position of the connecting rods 7 relative to one another, is rigidly connected via brackets 50a, 50b, 50c in a known manner with the connecting rods 7.

The front cushion 4, shown schematically in phantom lines, rests with its lower portion on a cushion-support armature 5.

The cushion-support armature 5 has at its front lower portion two pins 6 used as articulation points for connecting rods 7. The connecting rods 7 are furthermore articulated at their rear portion on pins 8 rigidly connected with the flanges 2.

The connecting rods are each connected with pins 9 arranged between the pins 6 and 8 to curved plates 10 the rear ends 10a of which are wider and each have a cutout 11 for engaging pivot pins 13 that are rotatably supported in a bearing member 14 fixedly connected at the vertically extending flange 2a of the armature 17.

The pins 13 are rigidly connected with arms 18 having connected thereto a transverse stay 20. One of the pins 13 has an extension 13a as a control handle the purpose of which will be explained hereafter.

Finally, the cushion-support armature 5 has a rear portion 5a provided with pins 21 for allowing the articulation of the front end of the connecting rods 22 on the pins 13.

It should also be noted that the curved plates 10 are normally maintained in their lower position by springs 23 rigidly connected, on the one hand, to the flanges 2 via fasteners 24, and, on the other hand, to the curved plates 10 via fasteners 25.

The armature 17 is provided with a substantially S-shaped horizontal lever 28, the front portion 29 of which extends vertically.

This lever 28 is articulated on a pin 30 rigidly connected with the armature 17. Its rear end 28a is provided with a window 31 for cooperating with a pin 32 rigidly connected with a fork 33. The central recessed portion 33a of the fork 33 cooperates with a stud 35 rigidly connected with the support structure 1.

When the front cushion 4 is in the high position (shown in phantom lines in FIG. 2), the connecting rods 7 as well as the connecting rods 22 are substantially vertical since the curved plates 10 are in engagement via their cutouts 11 with the pins 13.

The rearward movement of the end plates 10 causes the pivoting of the lever 28 in the clockwise direction about the pin 30 against the return action of the spring 30a. In fact, one of the curved plates 10, when being moved rearwardly, comes into abutment, with the vertical front portion 29 of the lever 28.

This movement causes the fork 33 to move forwardly, and the recessed central portion 33a is then locked underneath the stud 35. It should be noted that guides 60 that are rigidly connected to the plates 10 and glide on the connecting rods 22 facilitate a guiding of the curved plates 10.

Therefore, the front portion 4 of the cushion is perfectly latched in the lifted position and a child can thus sit on this portion of the seat, as shown in FIG. 1, while being held on the cushion 4 when the vehicle is moving such that his back bears on the seat back 50 and his head bears on the head-rest 51.

A safety belt 52, which normally is provided at the seat, is used without special adjustment.

When the child has been taken from the vehicle and when it is desired to put the front cushion 4 back into the rest position, it suffices to operate the control handle 13a so as to disengage the cutouts 11 of the curved plates 10 which then move away from the pins 13. This is acheived by rotating the transverse stay 20, fixedly connected with arms 18 to the pins 13, in an upward direction for lifting the plate 10 out of engagement.

Figure 3:
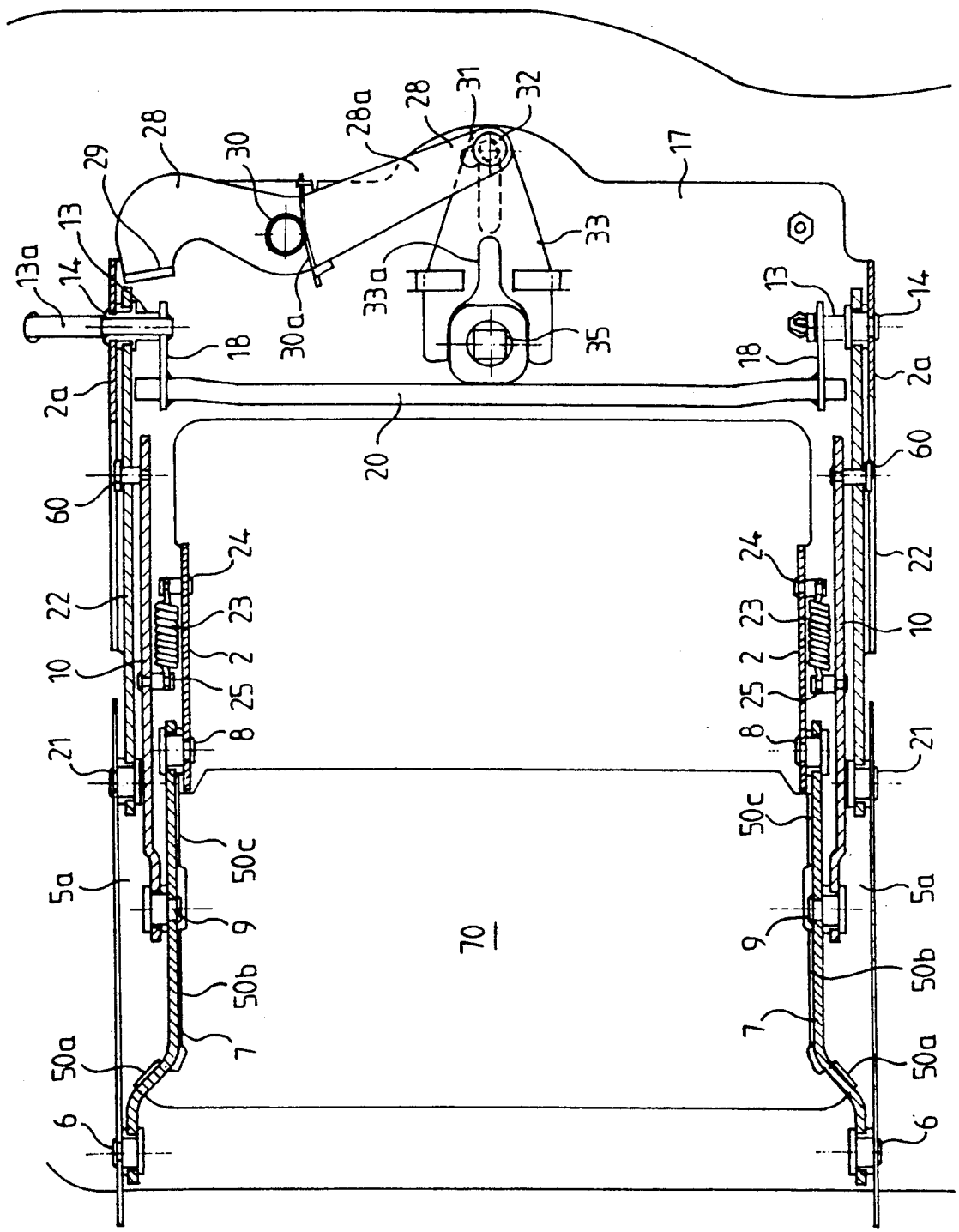
FIG. 3 is a plan view corresponding to FIG. 2.

The springs 23 return the members 7, 10, 22 into their initial position. The cushion 4 therefore resumes its original position, and the lever 28, under the action of the spring 30a, returns to its first position (see FIG. 3) and disengages the fork 33 from the stud 35.

Thus, a single operation allows, at the beginning, to latch perfectly the front cushion 4 in the lifted position, and a single operation of the control handle 13a allows to bring the front cushion 4 back to its rest position.

The present invention is, of course, in no way restricted to the specific disclosure of the specification and drawings, but also encompasses any modifications within the scope of the appended claims.

What I claim is:

1. A lifting device for a vertically adjustable front cushion of a vehicle seat, the vehicle seat having a seat portion comprised of said vertically adjustable front cushion and a fixed rear cushion, said lifting device comprising:

said vehicle seat comprising a support structure with two side portions, each said side portion having a first and a second vertically extending flange, each said first flange having a fixedly connected first pin and each said second flange having a fixedly connected bearing with a second pin rotatably supported in said bearing;

said vertically adjustable front cushion having a cushion support armature with a forward and a rearward portion, said forward portion having on either side a third pin and said rearward portion on either side a fourth pin;

first connecting rods pivotably connected with said first pins of said first flanges and with said third pins of said forward portion of said support armature, each said connecting rod having a fifth pin arranged between said first and said third pin;

second connecting rods pivotably connected with said second pins of said second flanges and with said fourth pins of said rearward portion of said support armature;

curved plates each having a front end and a rear end, said front end pivotably connected to said fifth pin and said rear end having a cutout;

an essentially horizontally extending S-shaped lever with a rear end, a center portion, and a vertically extending front end, said S-shaped lever pivotably connected with said center portion to said support structure;

a fork having a recessed central portion and a lug opposite said recessed central portion, said rear end of said S-shaped lever being connected to said lug;

a stud connected to said support structure;

arms fixedly connected with a first end to said second pins;

a transverse stay connecting free ends of said arms;

a control handle connected to one of said second pins;

wherein, when said front cushion is lifted into a upper position, said cutouts engage said second pins and one of said rear ends of said curved plates engages said vertically extending front end of said S-shaped lever and pivots said S-shaped lever, thereby displacing said fork with said recessed central portion into locking engagement with said stud for latching said front cushion in said upper position; and wherein, for releasing said front cushion from said upper position, said control handle is turned such that said transverse stay is upwardly rotated to disengage said cutouts from said pins and release said recessed central portion from its locking engagement with said stud.

2. A lifting device according to claim 1, further comprising springs connected to said first flanges and said curved plates for returning said curved plates into their rest position.

3. A lifting device according to claim 1, further comprising a return spring connected to said S-shaped lever and said support structure for returning said S-shaped lever into its resting position in which said fork is released from said stud.

* * * * *